US009366140B2

(12) United States Patent
Chamberlain

(10) Patent No.: US 9,366,140 B2
(45) Date of Patent: Jun. 14, 2016

(54) CERAMIC MATRIX COMPOSITE REPAIR BY REACTIVE PROCESSING AND MECHANICAL INTERLOCKING

(71) Applicant: Rolls-Royce Corporation, Indianapolis, IN (US)

(72) Inventor: Adam Lee Chamberlain, Mooresville, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 102 days.

(21) Appl. No.: 14/141,976

(22) Filed: Dec. 27, 2013

(65) Prior Publication Data

US 2014/0272248 A1 Sep. 18, 2014

Related U.S. Application Data

(60) Provisional application No. 61/802,250, filed on Mar. 15, 2013.

(51) Int. Cl.
*C04B 41/91* (2006.01)
*F01D 5/00* (2006.01)
(Continued)

(52) U.S. Cl.
CPC . *F01D 5/005* (2013.01); *B28B 1/42* (2013.01); *B28B 21/48* (2013.01); *C04B 35/571* (2013.01);
(Continued)

(58) Field of Classification Search
CPC .............................. Y10T 156/10; F01D 5/005
USPC .......................................................... 156/60
See application file for complete search history.

(56) References Cited

U.S. PATENT DOCUMENTS 4,800,065 A 1/1989 Christodoulou et al.
5,306,565 A 4/1994 Corbin et al.

(Continued)

FOREIGN PATENT DOCUMENTS

DE 19734211 A1 2/1999
GB 925509 A 5/1963
WO WO 2013/075155 A1 5/2013

OTHER PUBLICATIONS

B. H. Rabin et al. "Joining of fiber-reinforced SiC composites by in situ reaction methods" Materials Science and Engineering, A130, No. 1, Nov. 20, 1990, pp. L1-L5.

(Continued)

*Primary Examiner* — Brent O'Hern
(74) *Attorney, Agent, or Firm* — Shumaker & Sieffert, P.A.

(57) ABSTRACT

A method for modifying a ceramic matrix component is disclosed including identifying a non-conforming region of a composite component capable of operating in a gas turbine engine; removing at least a portion of the non-conforming region to create an exposed surface of the composite component; preparing a preform in response to the removing at least a portion of the non-conforming region; applying a reactive constituent surface region to at least one of the exposed surface of the composite component and the preform, the reactive constituent surface region being capable of producing a non-equilibrium condition; positioning the preform to provide a contact region between the exposed surface of the composite component and the preform proximate the reactive constituent surface region; and reacting the reactive constituent surface region in an equilibrium reaction at the contact region to form a bond structure between the exposed surface of the composite component and the preform.

18 Claims, 5 Drawing Sheets

10
12
11
13

(51) Int. Cl.

| | |
|---|---|
| ***C04B 35/571*** | (2006.01) |
| ***C04B 35/573*** | (2006.01) |
| ***C04B 35/80*** | (2006.01) |
| ***C04B 37/02*** | (2006.01) |
| ***F01D 5/28*** | (2006.01) |
| ***B28B 1/42*** | (2006.01) |
| ***B28B 21/48*** | (2006.01) |
| *C22C 1/04* | (2006.01) |
| *B22F 5/10* | (2006.01) |

(52) U.S. Cl.

CPC ............. *C04B 35/573* (2013.01); *C04B 35/803* (2013.01); *C04B 35/806* (2013.01); *C04B 37/023* (2013.01); *F01D 5/282* (2013.01); *F01D 5/284* (2013.01); *B22F 2005/103* (2013.01); *B22F 2999/00* (2013.01); *C04B 2235/5244* (2013.01); *C04B 2235/5248* (2013.01); *C04B 2235/6028* (2013.01); *C04B 2235/614* (2013.01); *C04B 2235/616* (2013.01); *C04B 2237/30* (2013.01); *C04B 2237/363* (2013.01); *C04B 2237/38* (2013.01); *C04B 2237/40* (2013.01); *C04B 2237/402* (2013.01); *C04B 2237/404* (2013.01); *C04B 2237/405* (2013.01); *C22C 1/04* (2013.01); *C22C 1/0416* (2013.01); *F05D 2300/6033* (2013.01); *Y10T 156/10* (2015.01); *Y10T 156/1028* (2015.01); *Y10T 428/20* (2015.01)

(56) References Cited

U.S. PATENT DOCUMENTS

| | | | | |
|---|---|---|---|---|
| 5,381,944 | A | 1/1995 | Makowiecki et al. | |
| 5,503,703 | A | 4/1996 | Dahotre et al. | |
| 5,538,795 | A | 7/1996 | Barbee, Jr. et al. | |
| 5,599,468 | A | 2/1997 | Mako et al. | |
| 5,942,064 | A | 8/1999 | Krenkel et al. | |
| 6,294,125 | B1 | 9/2001 | Bridgewater et al. | |
| 2002/0182362 | A1* | 12/2002 | Stowell .................. | C23C 24/08 428/63 |
| 2003/0006269 | A1 | 1/2003 | Horner et al. | |
| 2008/0190552 | A1 | 8/2008 | Bouillon et al. | |
| 2008/0284059 | A1 | 11/2008 | Merrill et al. | |
| 2010/0011910 | A1 | 1/2010 | Schedler et al. | |
| 2010/0038409 | A1 | 2/2010 | Wilden et al. | |
| 2014/0272248 | A1 | 9/2014 | Chamberlain | |

OTHER PUBLICATIONS

International Search Report and Written Opinion, mailed Jul. 9, 2014 for International Application No. PCT/US2013/078271.

Office Action from U.S. Appl. No. 14/097,873, dated Jan. 4, 2016, 18 pp.

Amendment in Response to Office Action mailed Jan. 4, 2016, from U.S. Appl. No. 14/097,873, filed Apr. 4, 2016, 16 pp.

* cited by examiner

CERAMIC MATRIX COMPOSITE REPAIR BY REACTIVE PROCESSING AND MECHANICAL INTERLOCKING

CROSS-REFERENCE TO RELATED APPLICATIONS

This application claims priority to U.S. Provisional Application Ser. No. 61/802,250, entitled "Ceramic Matrix Composite Repair by Reactive Processing and Mechanical Interlocking," filed Mar. 15, 2013, which is hereby incorporated by reference in its entirety.

TECHNICAL FIELD

The present invention generally relates to ceramic matrix composite repairs, and more particularly, but not exclusively, to repairs or modifications of ceramic matrix composite components in a gas turbine engine.

Present approaches to ceramic matrix composite repairs suffer from a variety of drawbacks, limitations, disadvantages and problems including those respecting cost, time and others. There is a need for the unique and inventive ceramic matrix composite repair apparatuses, systems and methods disclosed herein.

SUMMARY

One embodiment of the present invention is a unique ceramic matrix composite repair method. Other embodiments include apparatuses, systems, devices, hardware, methods, and combinations for ceramic matrix composite repairs. Further embodiments, forms, features, aspects, benefits, and advantages of the present application shall become apparent from the description and figures provided herewith.

Technological improvements in materials for the high temperature environment of a gas turbine engine have allowed the application of ceramic matrix composite (CMC) materials in hot section structural components. CMCs can include SiC/SiC systems with high temperature mechanical, physical and chemical properties allowing the operation of a gas turbine engine at higher temperatures. CMCs can also provide an additional benefit of improved damage protection when compared to monolithic ceramics.

DETAILED DESCRIPTION OF THE ILLUSTRATIVE EMBODIMENTS

Figure 1:
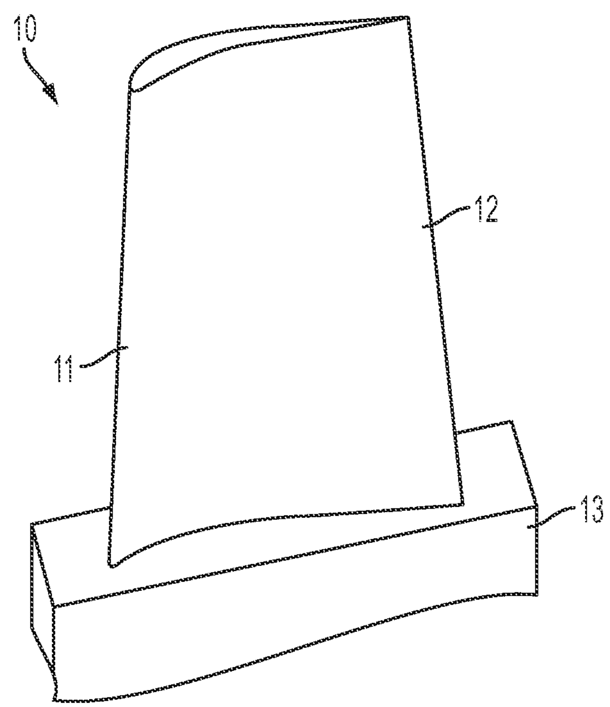
FIG. 1 is an illustration of a component of a gas turbine engine.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, a turbine blade 10 is an exemplary hot section component of a gas turbine engine. The blade 10 includes a leading edge 11, a trailing edge 12, and a root portion 13. While a turbine blade is shown in FIG. 1, other hot section components are contemplated and can include combustion liners, turbine vanes, and seal segments, for example.

A gas turbine engine hot section component, such as blade 10, can be manufactured with at least a portion of the blade being a ceramic matrix composite material (CMC). Ceramic matrix composite parts can be formed by laying up and shaping a fiber reinforcing phase. The fiber reinforcing phase can include various materials such as metallic and ceramic materials. The fiber reinforcing phase is infiltrated with a ceramic matrix material. Various physical and chemical processes can be utilized to produce a CMC component with the lay up process and the infiltration process. CMC components are capable of forming various geometries including blades, vanes, and liners for example.

CMC components can contain non-conformities due to complex macro and micro structures with multiple processing and handling functions applied during manufacturing. Non-conformities can exist due to operational damage including material degradation, foreign object impact, and wear to name a few. In further examples, non-conformities can exist due to an engineering design change thereby necessitating modification of a CMC component. Non-conformities or defects can include, but are not limited to, delamination, cracks, porosity, mis-formed or partially formed components, and lost features. Manufacturing and material costs can prohibit an indiscriminate disposal policy of non-conforming CMC components. An embodiment of the present application includes a ceramic matrix composite repair which can include mechanical interlocking and reactive processing.

An exemplary process utilizing an embodiment of the present application can include the removal of at least a portion of a non-conformity, such as a flaw or an area out of specification, and the replacement of the removed portion with a new section of CMC. The new patch is integrated with the component by a bond structure formed during an equilibrium reaction and can include forms of Ti, Zr, Hf, Mo, TA, Yb, Y, carbides, borides, silicides, and intermetallics. One embodiment can include a repair process suitable for structural applications such as blades and vanes in a gas turbine engine.

Figure 2:
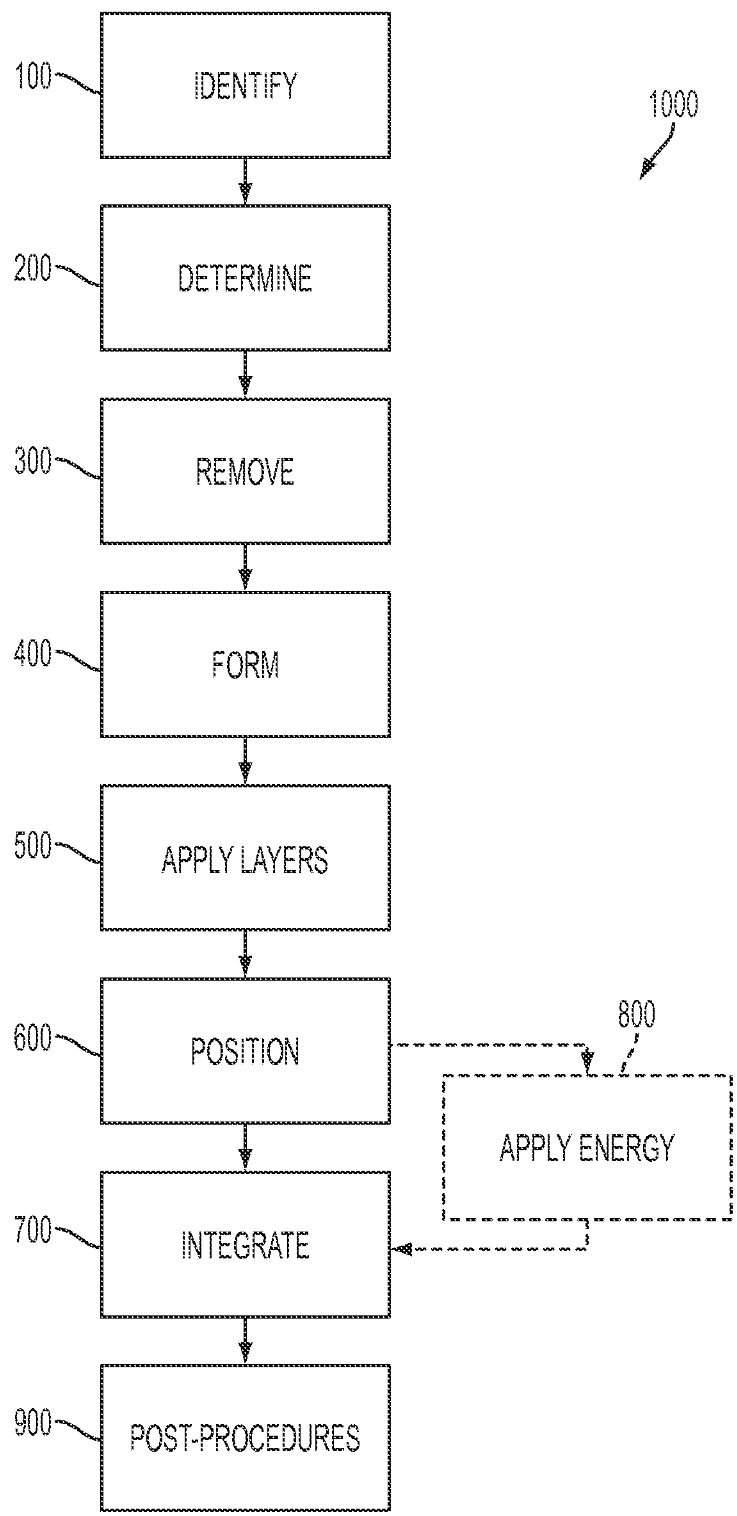
FIG. 2 is a flow diagram illustrating a process for repairing ceramic matrix composite component.

FIG. 2 is a flow diagram illustrating an embodiment of the present application including a Process 1000 for repairing a CMC component. The Process 1000 includes an Operation 100 to identify a non-conformity or damaged area. Identification in Operation 100 can include several types of inspection techniques including, for example, visual, ultrasonic, magnetic-particle, liquid penetrant, radiographic, remote visual inspection (RVI), eddy-current testing, and low coherence interferometry, and digital imaging. For an embodiment including a non-destructive evaluation such as IR inspection, a non-conforming portion can be revealed which is accessible for repair or modification. An embodiment applied to manufacturing non-conformities can include in-line inspections. Another embodiment applied to operational non-conformities can include inspections following an end of life cycle or a perceived reduction in performance, for example.

Figure 3A:
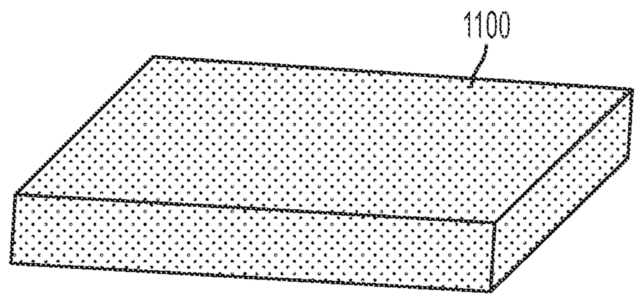
FIGS. 3*a* and 3*b* are illustrations of a portion of a component having a damaged section from an embodiment of the present application.
Figure 3B:
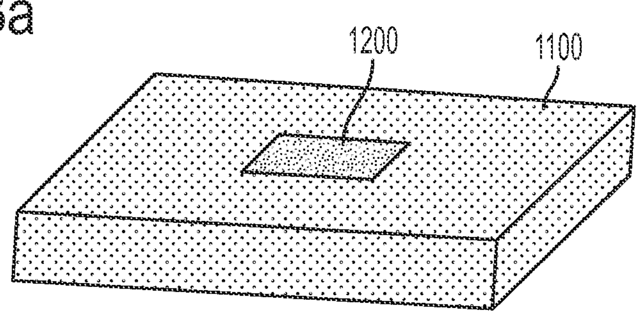

With reference to FIGS. 3*a* and 3*b*, a section 1100 of a CMC component is shown. In various embodiments, the geometry of the section 1100 of the component can vary in thickness, surface profile, size, topography and the like. The simplicity of the geometry shown is for clarity and should not be considered limiting. The section 1100 shown in FIG. 3*a* has a uniform cross-section. This property can also vary dependent on such parameters as material composition and component use.

FIG. 3*b* shows a non-conforming portion 1200 within the section 1100 of the CMC component. In one embodiment, the non-conforming portion 1200 can include a repairable portion identified on a component removed from service. In further embodiments, the non-conforming portion 1200 can include deviating regions identified on a component during manufacturing when compared with inspection or design standards. Non-conformities can be dimensional or material related. The non-conforming portion 1200 can be identified using various non-destructive evaluation techniques such as, but not limited to, infrared inspection (IR), ultrasonic, magnetic-particle, liquid penetrant, radiographic, remote visual inspection (RVI), eddy-current testing, and low coherence interferometry, and x-ray computer tomography (x-ray CT).

Returning to Process 1000, an Operation 200 includes determining a non-conforming repair volume. Operation 200 can be in response to the non-conforming portion identified in Operation 100. In one embodiment, after an inspection tool reveals an area accessible for repair, a non-conforming region or repair volume can be determined. A repair can be necessitated by damage or design changes. In response to identifying the non-conforming portion 1200, the geometry of a repair volume can be determined. The repair volume can include all or only a portion of the damaged or non-conforming portion 1200. Further, the repair volume can include a portion of a component which was not identified as being non-conforming on the component. A conforming portion removed can be proximate to the non-conforming portion. Inclusion of conforming portions can aid in creating bond surfaces, interlocking geometry, features and structural integrity, to name a few.

In another embodiment, the repair volume can be increased from a non-conforming dimension by a range of 5-100%. The increase can depend on the component structure for the area including the non-conformity and the repairable portion. For example, a repair volume for a repairable portion in an area with moderate stress can have minimum dimensions on the order of 0.5 in (or 12.7 mm). Smaller repair volumes can be assessed for areas of flow path regions with low stress. In one embodiment, a stress analysis of the component design under modification can be conducted and applied when determining the geometry of the repairable portion.

The Process 1000 can further include an Operation 300 to remove the repair volume and create a repair surface. The removal of the determined repair volume creates an exposed surface. Parameters of the exposed or new outer surface can be controlled as they can affect the integrity of the repair through an interaction with a repair patch. Such parameters can include, but are not limited to, size, geometry, and surface topography including roughness and profile.

In one embodiment, the creation of an exposed surface can include the removal of a non-conforming portion 1200 or a portion of the non-conforming portion 1200 in response to the determination of a repair volume. Material removal processes can include mechanical means such as conventional machining, ablation, and abrasion; chemical means such as etching; and thermal means. One embodiment can include ultrasonic machining. The application of an ultrasonic machining material removal technique can be limited to areas of line-of-sight for the repair volume being removed. The dimensions, type and extent of the repair volume can impact the selection of ultrasonic tool geometry.

Figure 4A:
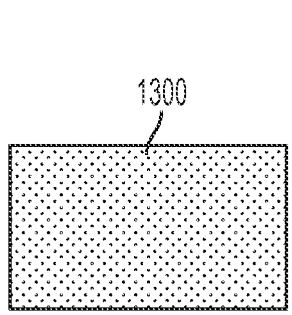
FIGS. 4*a* and 4*b* illustrate an ultrasonic tool for use in an embodiment of the present application and an example of a removal area from a non-conforming section.
Figure 4B:
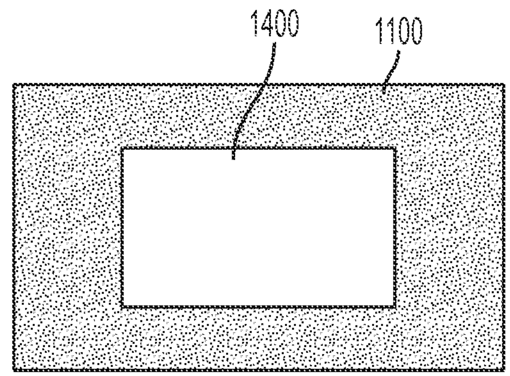

For an embodiment utilizing an ultrasonic tool, the ultrasonic tool can vary in the degree of complexity and can be defined by geometry specific to the defined non-conforming area including a single geometric shape, multiple or repeating shapes and free-form shapes. A representative embodiment is shown in FIGS. 4*a* and 4*b*. FIG. 4*a* demonstrates a simple rectangle ultrasonic tool 1300. When applied to a CMC section 1100 including a non-conformity, the ultrasonic tool 1300 creates a negative space or repair volume 1400 mimicking the geometry of the ultrasonic tool 1300. The application of the tool is not limited to planar removal. Removing the repair volume can include removing surface damage or damage which has translated through a thickness of the component. Further embodiments can include varying the removal depth.

In another embodiment, a selection of predetermined geometries for an ultrasonic tool can be included in a "tool box." The preselected tools within the tool box could contribute to a reduction in production or repair cycle times and costs. Preselected tool geometry can be determined based on defined non-conformities and cover a range of repairs. A predesigned tool can be utilized in embodiments applied in design changes and component modifications. A tool can be designed and applied repeatedly or several tools of the design can be made for multiple repeated applications to expedite a modification process.

Figure 5A:
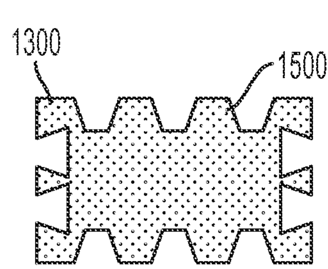
FIGS. 5*a* and 5*b* illustrate an ultrasonic tool for use in an embodiment of the present application and another example of a removal area from a non-conforming section.
Figure 5B:
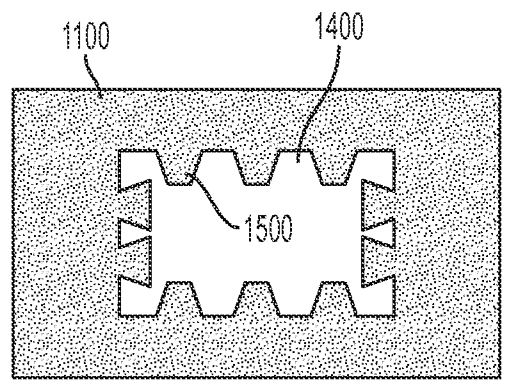

FIGS. 5*a* and 5*b* show a further embodiment of the present application. An ultrasonic tool 1300 is shown with a design including dovetail features 1500. The ultrasonic tool 1300 creates a repair volume 1400 in a CMC section 1100 having dovetails features 1500. The dovetail features 1500 of the repair volume 1400 in some embodiments can be applied as mechanical interlocking features with a new or replacement section of CMC (not shown).

In various embodiments, repair volume features including, for example, the dovetails described above, peg and biscuit holes, and tongue and groove joints, can enhance bonding with a new section of CMC by creating an increase in surface area. The new section of CMC can be capable of interlocking with the repair volume of the component under repair or modification via geometric features introduced by ultrasonic machining.

As part of Process 1000, Operation 400 includes forming a repair patch or preform. In one embodiment, a repair portion 1200 from a component is removed having a shape which allows the positioning of a repair preform or patch. A preform or patch is manufactured with a geometry which can be determined as a function of repair volume, type of damage or modification, extent of damage or non-conformity, stress analysis and other such parameters. Geometry for a repair or replacement patch formed in Operation 400 can be determined based on repair volume depth, type and extent of damage, component stress analysis, and other such parameters. An embodiment of Operation 400 can include the preparation of a preform. A further embodiment can include the formation of preforms such as but not limited to a repair patch, repair packing and a replacement portion of CMC. A still further embodiment of Operation 400 can include a replacement portion selected in response to the non-conforming portion, the repairable or repair volume, the type of nonconformity, and the like.

For one embodiment, a pristine piece of CMC including a SiC/SiC composition is machined according to the determined repair portion and the removed portion of the component. In some embodiments, the preform piece can be undersized slightly to accommodate a joining area. The amount of under-sizing can be a function of the joining scheme and in specific embodiments can be ≈0.002-0.01". The preform can further be machined using various methods as discussed previously with regards to the repair volume, including ultrasonic machining.

Operation 500 of Process 1000 further includes preparing an exposed repair surface and a preform surface for bonding a repair preform to a repair volume of a CMC component. The exposed repair surface of a repair volume created in a component is one part of a reaction region in which alternating layers of constituents for an equilibrium reaction are applied. The surface of a repair preform can form a complimentary surface to the reactive surface region. Operation 500 surface preparation can include applying alternating layers of at least two constituents. In one embodiment, alternating layers of carbon and a metallic (Si, Ti, Zr, and Hf) can be applied.

Figure 6:
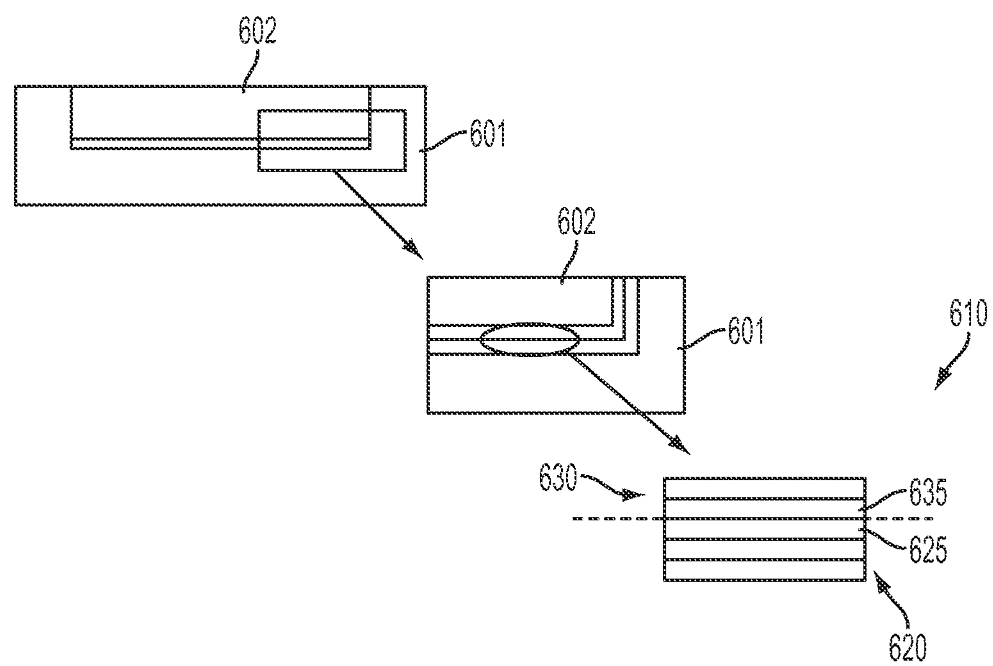
FIG. 6 is a schematic showing a repair patch and a repair volume with reactive constituents applied to their surfaces.

FIG. 6 provides further detail regarding embodiments having an alternating layer region 610. A surface of a repair volume 601 includes a first layer arrangement 620 having a first outer coating 625 including a first material. A repair preform 602 includes a second layer arrangement 630 having a second outer coating 635 including a second material. The composition of the second outer coating 635 being different from the composition of the first outer coating 625.

Figure 7:
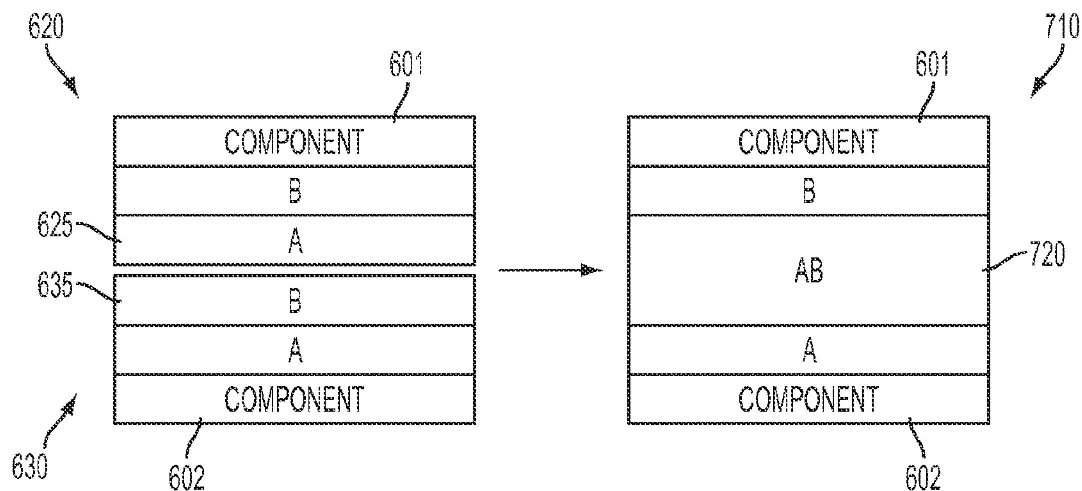
FIG. 7 is an illustration of a reaction of one embodiment of the present application.

More detail of an exemplary illustration of the joint between the two parts 601,602 is shown in FIG. 7. For this embodiment, a first arrangement of reaction layers 620 is formed by alternating at least one layer of a first constituent A and at least one layer of a second constituent B on the surface of the repair volume 601. A second arrangement of reaction layers 630 is formed by alternating layers of the first constituent A and the second constituent B on the surface of the repair preform 602.

The surface of the repair volume 601 with a first outer coating 625 of the first arrangement of reaction layers 620 can include the first constituent A. The repair preform 602 with a second outer coating 635 of the second arrangement of reaction layers 630 can include the second constituent B. The composition of the outer coatings of either part can contain either the first constituent or the second constituent so long as the opposing outer coating includes the complimentary constituent to form a non-equilibrium condition.

In Operation 600 of Process 1000, the prepared preform is positioned relative to the repair volume of the component for joining the two parts. Bringing the alternating layers of the parts together as shown in the highlighted view of FIG. 6 includes direct contact of the layers. The space between the outer coatings shown in FIG. 7 is for illustrative purposes to distinguish the two coatings. The two coatings are separate coatings of the two repair parts which are brought together when the repair preform is adjoined to the repair volume of the component. The coatings are in contact sufficient to create a non-equilibrium condition and to promote a reaction which forms a reaction bond between the parts. In one embodiment of the present application, a repair surface of a repair volume is brought in contact with a surface of a repair preform. The repair surface and the preform surface are dimensioned to fit against each other so the arrangement of layers of one surface is within a reaction range of the other.

The surface of the repair volume 601 and the surface of the repair preform 602 can be arranged or assembled where one surface fits against the other surface with the first outer surface 625 in contact with the second outer surface 635 to form a repaired component. The first and second outer surfaces 625,635 can be representative of alternating layer regions repeated or applied multiple times or in multiple places on the parts. The application of the alternating layers can be either sequential or at the same time along the surfaces 601,602. The materials applied can vary with the location of the regions in relation to the joint between parts. Joining locations and material applications of the arrangement of layers 610 can be a function of the surfaces and the joint geometry as well as the component materials.

Continuing with Process 1000, Operation 700 includes an integration reaction to form a bond between the surface of a repair volume on a component and a repair or replacement preform. When the component and the preform are brought together, the outer coatings applied in Operation 600 are placed in contact. When one outer coating includes one part of a non-equilibrium condition and the other outer coating includes the other part of the non-equilibrium condition, bringing the two coatings within a reactive range creates the non-equilibrium condition and starts the non-equilibrium reaction. In the embodiment shown with respect to FIG. 7, the second outer coating 635 contains the second constituent B while the first outer coating 625 contains the first constituent A where A and B are selected to provide a non-equilibrium condition.

The layers or regions in an arrangement can be distinguished by changes in at least one property when moving from one location to another of the coating arrangement. The changes can be abrupt or gradual. One example is an embodiment with a first region having a majority concentration of a first element. A relatively sharp change in concentration can be present when moving from the first region to a second region. The second region can have a majority concentration of a second element. In other variations, a predominant concentration of the first element in the first region can gradually transition to a predominant concentration of the second element in the second region.

A coating of alternating layers including the arrangements of layers 620,630 can be applied by various methods selected in relation to the joining material and the joint geometry. The alternating layers can be applied by at least one process such as, but not limited to, direct vapor deposition, chemical vapor deposition, plasma spraying, laser vapor deposition, slurry infiltration, liquid melt infiltration, and electron beam physical vapor deposition. For some embodiments, layers can be 0.01-5 um thick. For other embodiments, the joint surface can require a non-line-of-sight application; therefore a direct vapor deposition process can be used. Alternating layers can further refer to various patterns of layers or regions when the pattern is either regular or irregular depending on the number and type of layers and constituents. Layer patterns can be repeated once, multiple times or not at all. The pattern of the alternating layers can allow the selection of subsequent layers or constituents to be different in some way from the preceding or succeeding layer or constituent.

An element or constituent composed within the alternating layers can include a single chemical element, a mix of multiple elements, a simple or complex compound, and various phases of the elements, compounds and materials. In various embodiments, constituents can include elements such as titanium, zirconium, niobium, vanadium, hafnium, tantalum, molybdenum, chromium, tungsten, silicon, carbon, boron, aluminum, and nickel for example. The constituents are chosen in response to the creation of a non-equilibrium condition such as a system with a negative Gibbs free energy system as discussed in further detail below.

Returning to FIG. 7, a bond structure 710 is formed between the surface of the repair volume 601 and the surface of the repair preform 602 during an equilibrium reaction and includes a product AB of the equilibrium reaction in the bond layer 720. In one embodiment, the bond structure 710 can include a graded bond structure having at least one compound formed from the first constituent A and the second constituent B. In other embodiments, the bond layer can include an interlayer of constituent compounds such as carbides, nitrides, borides, silicides, and combinations thereof and a diffusion layer at the interface of the parts.

Additionally, the equilibrium reaction can take place in various atmospheres which can be selected based on the constituents or materials applied in the alternating layers and the parts. Parameters for an atmosphere can include temperature, pressure and composition. Temperature can be at room temperature or at an elevated temperature, for example. Pressure can be at various levels, such as but not limited to, ambient, atmospheric and in a vacuum. Atmosphere composition can include a pure gas or a mix of gases where the gas or gases can be nonreactive gases such as, but not limited to, argon and relatively reactive gases such as, but not limited to, hydrogen, oxygen and nitrogen.

In one embodiment two repair parts 601,602 with alternating layers can be placed within an atmosphere. A gas composition in the atmosphere can include a reactant. The reactant supplied in the atmosphere can participate in the equilibrium reaction to form compounds of the reactant. The reactant can be, for example, nitrogen where the reaction creates nitrides in the resulting layers. Gases can provide advantages and disadvantages. For example, oxygen can aide in the wetting of some brazing applications while oxygen and moisture can be detrimental because of oxidation reactions. The application of an atmosphere and a gas reactant can be selected in response to the other constituents of the non-equilibrium reaction and the components being joined together.

Figure 8:
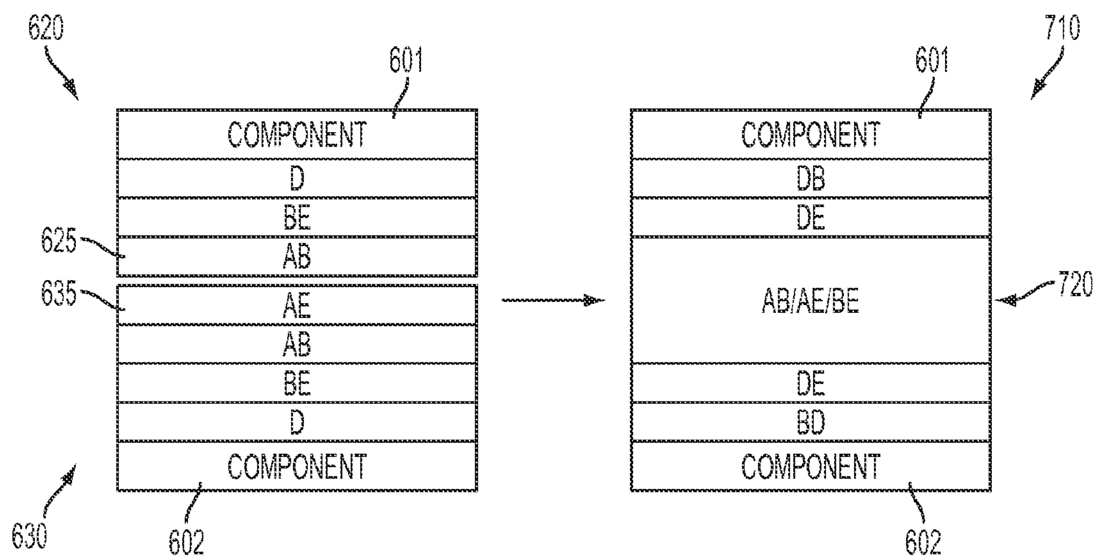
FIG. 8 is an illustration of another reaction of one embodiment of the present application.

In further embodiments, the temperature and chemical stability of a reaction system can be approached with complex layers and multiple constituents. Multiple constituents can be selected to produce a negative Gibbs free energy for the joint parameters of the components. An exemplary embodiment is shown in FIG. 8 where at least one additional constituent can be applied with a first constituent and a second constituent to create a self-propagating reaction to bind a repair part with a second repair part. Layers of the constituents are applied to the surface of each part at the joint location. The repair parts are assembled with the outer layers of each part in direct contact. The outer layers include complimentary constituents to create the non-equilibrium condition.

In the pre-reaction layers, multiple constituents can be present in separate micro-phases, separate macro-phases, compounds, solution, and various other forms. A first outer surface layer 625 of a first repair part 601 includes the constituents A and B. A second outer surface layer 635 of a second repair part 602 includes the constituents A and E. Constituents A and B of the first outer surface layer 625 were chosen to produce a non-equilibrium condition when in proximity to the second outer surface layer 635 with constituents A and E. An additional layer is shown to include constituents B and E. An intermediate layer of constituent D is also shown as an alternative.

A reaction can take place creating a bond or diffusion layer including various forms of AB, AE, and BE. These materials can be formed in a single compound, various phases within another and the like. Other layers can be created, as shown in FIG. 8, with a product layer of constituents D and E and a product layer of constituents B and D. The chemical composition and physical microstructure of the bond layer and any intermediary layers are a function of the constituents and process parameters.

When the first constituent A and the second constituent B are selected to produce a thermodynamic non-equilibrium condition between the first and second constituents A,B, a self-propagating reaction of the first constituent A and the second constituent B can drive the thermodynamic non-equilibrium condition toward a thermodynamic equilibrium condition. A thermodynamic non-equilibrium condition is present in a system that is not in a state of balance and where there are net flows of matter or energy, phase changes, unbalanced potentials or driving forces. Non-equilibrium can be expressed in various ways including an unbalanced chemical potential and a negative Gibbs free energy, for example. An unbalanced chemical potential or diffusive non-equilibrium represents a system's potential for moving a reaction in a particular direction. Gibbs free energy or free enthalpy represents the obtainable process-initiating work of a thermodynamic system. A system can move from a negative to a positive Gibbs free energy by rearranging constituents to form structures and compounds with more free energy. A system with a negative Gibbs free energy attempts a transformation to minimize the chemical potential of the system and move to a positive Gibbs free energy.

A system in non-equilibrium has the potential for initiating work and driving the system to equilibrium. By selecting the materials to create a non-equilibrium state, the system can have the potential to drive a reaction with the selected materials and form an equilibrium state. The formation of an equilibrium state can be the formation of a reaction bond including the selected materials. The reaction bond forms as a result of the system being driven from a non-equilibrium state to an equilibrium state. For one embodiment, the equilibrium state can include a reaction layer arrangement formed with at least a bond layer including a first material and a second material.

In a further embodiment of Process 1000, Operation 800 includes facilitating a self-propagating reaction of a non-equilibrium condition by applying an energy to the contacting alternating layers between a repair preform adjoined with a repair component. Various combinations of materials can produce a non-equilibrium or negative Gibbs free energy condition but the reaction to bring the system to equilibrium can be time prohibitive, for example. In one embodiment, the applied energy can facilitate such a reaction by accelerating the reaction rate. In other embodiments, the equilibrium reaction can require a threshold energy to initiate the equilibrium reaction. The intensity and duration of the applied energy can vary as a function of the materials selected and the parameters of the equilibrium reaction.

This energy can include electromagnetic energy, radiant energy, electrical energy, thermal energy and the like. Energy sources can include various forms such as, but are not limited to, the following:

- Furnaces—a repair assembly is placed in a high temperature furnace and rapidly heated to insure a self-propagating high-temperature synthesis (SHS) reaction.

Electrical sparks—a voltage source is applied to exposed ends of a repair joint in order to initiate the reaction forming a propagation wave which reacts along the length of the repair joint.

Quartz lamp heaters—localized and rapid heating by high intensity lamps is provided to a repair joint.

Torches (plasma, oxy-acetylene, etc.)—local heating by means of external flame is provided to a repair joint to create a self-propagating reaction wave.

Thermite—the coating layers of Al and $Fe_2O_3$ are added to a repair joint where the reaction proceeds as a result of adding another energy source to activate the thermite which provides additional energy to drive the reaction to completion.

Inertia welding—using available inertia welding technology, parts are imparted with relative motion and force is applied to generate energy through friction. Rotary inertial welding involves a stationary side and a second side where the second side is revolving at a high rpm rate. Once the revolving side reaches the set rpm, the parts are pressed into contact resulting in frictional heating.

Lasers—similar to laser welding, high intensity laser energy is selectively applied at a repair joint as well as near the repair joint to manage thermal stresses.

Electron beams—similar to electron beam welding, an electron beam heats and/or melts materials in and around a repair joint.

Direct resistance heating—a positive and negative electrode are applied directly to the repair part to impart a current flow and resistive heating. The terminals can be applied strategically to heat the part uniformly or to localize the heating effect.

Induction heating—induction is applied directly to one or both materials or to a susceptor for local or bulk radiation.

Eutectic melt infiltration—a minimal pressure is applied to a preform/component assembly to facilitate liquid eutectic melt flow on the bond surfaces. A Si rich metal eutectic material can be used such as but not limited to Si—Mo, Si—Zr, Si—Hf, Si—Ti, Si—Mo, Si—Ta, Si—Yb, and Si—Y. A carbon deposition layer (vapor deposition, organics—high char yield, painting) can be used to add carbon to the reaction and further enhance carbide formation in the bond region. A non-equilibrium condition between either or both of a first and second constituents and the eutectic melt material can drive the equilibrium reaction to form a bonding structure with a reaction product of the equilibrium reaction.

In one example, the energy source can be selected as a function of the size and complexity of the system and the materials being applied. In various embodiments, one or more energy sources can be applied to a system concurrently, sequentially, and in variable locations, for example. Applied energy can facilitate an equilibrium reaction which drives the system from non-equilibrium to equilibrium. Equilibrium can be a partial completion of a reaction with remaining reactants available. Equilibrium is a status that is relative and can be non-static in nature. Facilitating can include accelerating the reaction between the constituents.

In further embodiments, a fixture or tool can be utilized to hold a repair patch in position with respect to a repair volume of a component. The tool can apply an external force to hold the repair preform in place and to provide a pressure for creating contact between layers of a first constituent on a repair preform and a second constituent on a surface or a repair volume where contact can drive a thermodynamic non-equilibrium reaction. In some embodiments, the tooling material can be selected based on the source of an applied energy. For example, furnace heating could require a low expansion refractory alloy for tooling such as a TZM molybdenum alloy. In another example, applications of localized heating could employ stainless steel or nickel alloys.

Process 1000 can include post-bonding Operation 900. In one embodiment, Operation 900 can include a porosity reducing process which is applied following the equilibrium reaction to reduce porosity that may be present in the joint due to various factors related to the reaction. Self-propagating reactions can create continuous porous networks that can be infiltrated to provide various characteristics. Infiltrating materials can include Si—Zr, Si—Ti, Si—Hf, Si—Mo eutectic alloys. Materials for infiltration can include, but are not limited to, preceramic polymer, standard braze alloy, molten metal, metal compounds and so forth. The infiltrating material can be selected based on the component material, the constituents or diffusion materials, operating parameters and the like.

In one embodiment of the present application, a surface of a repair patch is prepared by applying at least one reaction layer of a first constituent in a first outer layer. A repair surface of a repair volume is prepared by applying at least one reaction layer of a second constituent in a second outer layer. In other embodiments, the at least one reaction layer can include an arrangement of reaction layers formed by alternating at least one layer of the first constituent and at least one layer of the second constituent.

The repair patch can be joined to the repair surface of the repair volume in the component using a submicron layer approach with reactive melt infiltration. When the prepared surfaces of the repair patch and repair volume are brought into contact with force and, in some embodiments, energy, a reaction bond is formed between the repair patch and the component. Reactive melt infiltration can be used for some embodiments in areas in which operating temperatures stay below 2400° F. being limited by the lowest melting point of system. In an embodiment for a SiC/SiC CMC, this can be silicon.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method for modifying a ceramic matrix composite component comprising:

removing at least a portion of a non-conforming region of the ceramic matrix composite component to create an exposed surface of the ceramic matrix composite component;

applying a reactive constituent surface region on at least one of the exposed surface of the ceramic matrix composite component or a surface of a perform;

positioning the preform to provide a contact region between the exposed surface of the ceramic matrix composite component and the preform, wherein the reactive constituent surface region is positioned between the ceramic matrix composite component and the perform; and reacting the reactive constituent surface region in an equilibrium reaction at the contact region to form a bond structure between the ceramic matrix composite component and the preform.

2. The method of claim 1, wherein removing the at least a portion of the non-conforming region comprises ultrasonically machining the at least a portion of the non-conforming region of the ceramic matrix composite component to create the exposed surface of the ceramic matrix composite component.

3. The method of claim 1, wherein applying the reactive constituent surface region comprises applying at least a first constituent and a second constituent on the at least one of the exposed surface of the ceramic matrix composite component or the surface of the preform, wherein the first constituent and the second constituent are configured to react in the equilibrium reaction to form the bond structure between the ceramic matrix composite component and the perform.

4. The method of claim 3, wherein applying the reactive constituent surface region on the at least one of the exposed surface of the ceramic matrix composite component or the surface of the preform comprises:

applying a first plurality of layers on the exposed surface of the ceramic matrix composite component, wherein the first plurality of layers comprises a first outer coating comprising the first constituent, and wherein at least one layer of the first plurality of layers comprises the second constituent and applying a second plurality of layers on the preform, wherein the second plurality of layers comprises a second outer coating comprising the second constituent, and wherein at least one layer of the second plurality of layers comprises the first constituent.

5. The method of claim 3, further comprising applying an energy source to the reactive constituent surface region to facilitate the equilibrium reaction.

6. The method of claim 5, wherein applying the energy source accelerates the equilibrium reaction.

7. The method of claim 5, wherein applying the energy source initiates the equilibrium reaction.

8. The method of claim 5, wherein applying the energy source comprises infiltrating the reactive constituent surface region with a eutectic melt material.

9. The method of claim 8, wherein a non-equilibrium condition between the eutectic melt material and at least one of the first constituent or the second constituent drives the equilibrium reaction.

10. The method of claim 1, further comprising applying a non-destructive evaluation technique to identify the non-conforming region of the ceramic matrix composite component.

11. The method of claim 3, wherein applying the reactive constituent surface region comprises forming alternating layers of the first constituent and the second constituent, wherein the first constituent and the second constituent are selected from the group consisting of titanium, zirconium, niobium, vanadium, hafnium, tantalum, molybdenum, chromium, tungsten, silicon, carbon, boron, aluminum, nickel, and combinations thereof.

12. A method for modifying a ceramic matrix composite component comprising:

removing at least a portion of a repairable portion of the ceramic matrix composite component to form a repair surface on the ceramic matrix composite component;

applying a first reaction layer to the repair surface, wherein the first reaction layer comprises a first constituent;

positioning a repair patch to fit against the repair surface of the ceramic matrix composite component, wherein the repair patch comprises a base ceramic matrix composite component and a second reaction layer comprising a second constituent on the base ceramic matrix composite component, wherein the repair patch is positioned with the second reaction layer contacting the first reaction layer, and wherein the first constituent and the second constituent produce a non-equilibrium condition; and reacting the first constituent and the second constituent in an equilibrium reaction to form a bonding structure between the repair patch and the ceramic matrix composite component.

13. The method of claim 12, wherein reacting the first constituent and the second constituent in the equilibrium reaction comprises applying an energy source to facilitate the equilibrium reaction.

14. The method of claim 13, wherein applying the energy source comprises infiltrating the first reaction layer and the second reaction layer with an eutectic melt material.

15. The method of claim 14, wherein the eutectic melt material comprises at least one of Si, Si—Mo, Si—Zr, Si—Hf, Si—Ti, Si—Mo, Si—Ta, Si—Yb, or Si—Y.

16. The method of claim 12, wherein removing the at least a portion of the repairable portion of the ceramic matrix composite component forms a repair volume having geometric features, the method further comprising machining the repair patch to form complementing geometric features configured to interlock with the geometric features of the repair volume.

17. The method of claim 12, wherein the first constituent comprises at least one of titanium, zirconium, niobium, vanadium, hafnium, tantalum, molybdenum, chromium, tungsten, silicon, carbon, boron, aluminum, or nickel.

18. The method of claim 11, wherein the second constituent includes at least carbon.

* * * * *